(12) United States Patent
Shikayama et al.

(10) Patent No.: US 7,635,929 B2
(45) Date of Patent: Dec. 22, 2009

(54) CANNED LINEAR MOTOR ARMATURE AND CANNED LINEAR MOTOR

(75) Inventors: Toru Shikayama, Kitakyushu (JP); Toshikazu Hamao, Kitakyushu (JP); Kenichi Sadakane, Kitakyushu (JP); Akio Sakai, Kitakyushu (JP); Shusaku Yoshida, Kitakyushu (JP)

(73) Assignee: Kabushiki Kaisha Yaskawa Denki, Kitakyushu-shi (JP)

( * ) Notice: Subject to any disclaimer, the term of this patent is extended or adjusted under 35 U.S.C. 154(b) by 0 days.

(21) Appl. No.: 12/090,739

(22) PCT Filed: Sep. 8, 2006

(86) PCT No.: PCT/JP2006/317849

§ 371 (c)(1),
(2), (4) Date: Apr. 18, 2008

(87) PCT Pub. No.: WO2007/046200

PCT Pub. Date: Apr. 26, 2007

(65) Prior Publication Data

US 2008/0265691 A1    Oct. 30, 2008

(30) Foreign Application Priority Data

Oct. 18, 2005    (JP) .............................. 2005-302401

(51) Int. Cl.
*H02K 41/00* (2006.01)
(52) U.S. Cl. .......................................... 310/12; 310/43
(58) Field of Classification Search .................. 310/12, 310/43, 71
See application file for complete search history.

(56) References Cited

U.S. PATENT DOCUMENTS

| | | | | |
|---|---|---|---|---|
| 3,659,354 | A | * | 5/1972 | Sutherland ................... 434/113 |
| 6,084,319 | A | * | 7/2000 | Kamata et al. ................ 310/12 |
| 2007/0252444 | A1 | * | 11/2007 | Sadakane et al. .............. 310/12 |

FOREIGN PATENT DOCUMENTS

| | | | |
|---|---|---|---|
| JP | 2004-23960 A | | 1/2004 |
| JP | 2004-312877 A | | 11/2004 |
| JP | 2004312877 | * | 11/2004 |
| WO | 2005/112233 A1 | | 11/2005 |
| WO | WO2005112233 | * | 11/2005 |

OTHER PUBLICATIONS

WO2005112233 translation, machine translated on Mar. 25, 2009.*

* cited by examiner

*Primary Examiner*—Quyen Leung
*Assistant Examiner*—Leda Pham
(74) *Attorney, Agent, or Firm*—Sughrue Mion, PLLC

(57) ABSTRACT

A canned linear motor armature and a canned linear motor. The canned linear motor armature including a winding accommodating frame formed in the shape of a recess which accommodates an armature winding; a flat plate-shaped connection substrate which connects the armature winding; cans which close airtightly both opening portions of the housing; refrigerant passages formed respectively between the can and the winding accommodating frame and between the can and the connection substrate; and a lead wire which connects the connection substrate and a terminal base, is so constructed that coating with an adhesive resin is provided around a land that is a connection part for connecting the armature winding and the lead wire on the connection substrate so as to include the connection part, and the surroundings of the adhesive resin are filled with a filled resin.

10 Claims, 8 Drawing Sheets

CANNED LINEAR MOTOR ARMATURE AND CANNED LINEAR MOTOR

TECHNICAL FIELD

The present invention relates to a canned linear motor armature and a canned linear motor which are used for stage drive in a semiconductor manufacturing apparatus or for table feeding in a machine tool, and which require reduction of a temperature rise of a linear motor main body and improvement in reliability of insulation.

BACKGROUND ART

In a canned linear motor armature and a canned linear motor which have been hitherto used for stage drive in a semiconductor manufacturing apparatus or for table feeding in a machine tool, and which require reduction of a temperature rise of a linear motor main body and improvement in reliability of insulation, an armature winding is covered with a can, and a refrigerant is supplied to flow through a refrigerant passage provided between the armature winding and the can, thereby recovering heat generated from the armature winding by the refrigerant and reducing the temperature rise of a surface of the linear motor (refer to, for example, Patent Documents 1 and 2).

FIG. 1 is an entire perspective view of a general canned linear motor having a movable element in which an armature is covered with a can, which shows the entire constitution common to that in a first embodiment of the invention described later and that in a related art.

In FIG. 1, a reference numeral 100 designates a stator, designates a housing, 102 designates a can, 103 designates a can fixing bolt, 104 designates a pressing plate, 105 designates an armature winding, 106 designates a terminal base, designates a refrigerant supply port, 108 designates a refrigerant discharge port, 111 designates a connection substrate, 112 designates a winding accommodating frame, 200 designates a movable element, 201 designates a field yoke support member, 202 designates a field yoke, and 203 designates a permanent magnet.

One movable element 200 includes the field yoke 202, the plural permanent magnets 203 for field arranged adjacently on the inner surface of the field yoke 202 so that polarities are alternately different, and the field yoke support member 201, and has the -shaped section. Further, the other stator 100 is so constructed that the armature winding 105 is covered with the can 102 and inserted in a hollow space in the movable element so as to be opposed to magnet arrays of the permanent magnets 203 through a gap.

Under such the constitution, the movable element 200 is supported by a not-shown linear rolling guide or a not-shown hydrostatic bearing guide so that the movable element 200 can move in relation to the stator 100 in the direction of arrows. A refrigerant is supplied from the refrigerant supply port 107 provided in the housing 101 and discharged from the refrigerant discharge port 108.

FIG. 12 shows a canned linear motor in a related art, corresponding to a front sectional view taken along the inside of a line A-A of FIG. 1 (½ model).

In FIG. 12, a reference numeral 109 is an O-ring, 110 is a refrigerant passage, and 113 is a molding resin.

The stator 100 includes the frame-shaped metallic housing 101, the plate-shaped can 102 having the outer shape of the housing 101 in order to close airtightly both opening parts of the housing 101, the can fixing bolt 103 for fixing the can 102 to the housing 101, the pressing plate 104 which has a through-hole for the can fixing bolt 103 and presses the can 102 by an equal load, the armature winding 105 arranged in the hollow part of the housing 101, the connection substrate 111 for wiring the armature winding 105, the winding accommodating frame 112 for accommodating the armature winding 105 therein, and the O-ring 109 formed to be slightly larger than the hollow part of the housing 101. The external shape of the connection substrate 111 and the external shape of the winding accommodating frame 112 are formed respectively to be slightly smaller than the hollow part of the housing 101, the connection substrate 111 is formed of a thin plate, and the winding accommodating frame is formed of a thick plate. Further, the winding accommodating frame 112 is formed to be slightly larger than the external shape of the armature winding 105 in order to accommodate the armature winding 105 therein, and has the shape of a recess in which a bottom portion is opened.

The armature winding 105, after being accommodated in the winding accommodating frame 112, is covered tightly with the connection substrate 111, and the inside of the covered portion is molded by the molding resin 113. Further, the armature winding 105 and the connection substrate 111 are electrically connected to each other. The armature winding 105 of which surroundings are thus constructed is fixed to the housing 101 through the connection substrate 111 or the winding accommodating frame 112 by a bolt (not shown). On the edges of the front and back sides of the housing 101, circulating grooves are provided, and the O-rings 109 are arranged in the grooves. Then, the cans 102 are arranged on the front and back parts of the housing 101. The pressing plate 104 is laid on the can 102 along the edge of the housing 101 and fastened by the can fixing bolt 103, so that the can 102 is fixed to the housing 101. At this time, between the can 102 and the connection substrate 111, and between the can 102 and the winding accommodating frame 112, a fixed gap is formed respectively, and this gap becomes the refrigerant passage 110. The refrigerant is supplied from the refrigerant supply port 107 provided in the housing 101 and discharged from the refrigerant discharge port 108. The refrigerant flows in the refrigerant passage 110 to cool the armature winding 105 which generates heat due to copper loss. Further, as the refrigerant, conventionally, a fluorine-based inert refrigerant which has an extremely small electric conductivity and the insulating property (for example, hydrofluoric ether (HFE) produced by Sumitomo 3M Ltd.) has been used. In recent years, by a request of more reduction of the temperature rise, there has been used water (including pure water and ultra pure water) which is large in thermal conductivity and specific heat and extremely high in heat recovery.

FIG. 13 shows a canned linear motor in the related art, corresponding to a side sectional view taken along the inside of a line B-B of FIG. 1 (½ model).

In FIG. 13, a reference numeral 120 is a lead wire, 121 is a land, 122 is a lead wire cover, and 130 is a resin. A foil pattern (not shown) for connecting the armature winding 105 and the lead wire 120 is provided for the connection substrate 111, and the land 121 is provided at a terminus of the copper foil pattern. One end of the lead wire 120 is connected to the land 121 by solder, and the other end thereof is connected to the terminal base 106. Further, the recess portion corresponding to the upper portion of the land 121 is filled with the resin 130, and the lead wire cover 122 is arranged at the boundary between the recess portion and the refrigerant passage 110.

In the thus constructed canned linear motor, a three-phase alternating current corresponding to the electric relative position of the movable element 200 and the stator 100 is supplied to the armature winding 105, whereby a thrust is generated in the movable element 200 by an action on a magnetic field formed by the permanent magnet 203. At this time, since the armature winding 105 in which heat is generated by the copper loss is cooled by the refrigerant flowing in the refrigerant passage 110, the rise of the surface temperature of the can 102 can be suppressed. Further, since the water (including pure water and ultra pure water) which is large in thermal conductivity and specific heat and high in heat recovery can be used, the rise of the surface temperature of the can 102 can be suppressed so as to be extremely low.

Patent Document 1: Japanese Patent Application No. 2004-148203 (Specification Page 7, and FIGS. 1 to 5)

Patent Document 2: JP-A-2004-312877 (Specification Pages 4 to 5, and FIG. 2)

DISCLOSURE OF THE INVENTION

Problems to be Solved by the Invention

However, in the conventional canned linear motor armature and the conventional canned linear motor, when the water flows in the refrigerant passage near the lead wire, the following problem arises.

Namely, adhesive separation arises between the connection substrate and the resin, so that there is fear that permeation of the water into its separation part might cause decrease of insulation resistance or insulation breakdown in the joint part between the lead wire and the connection substrate. Mechanism by which this problem is caused is as follows:

(1) When the electric current flows to the armature winding, the armature winding generates heat, whereby the connection substrate and the winding accommodating frame which are component members around the armature winding become high in temperature, and the resin covering the lead wire also becomes high in temperature due to thermal conductivity. The resin, since comes into contact with the water of the refrigerant at the peripheral portion of the lead wire cover, absorbs the refrigerant from its portion. The temperature rise of the resin and the water absorption arise simultaneously, whereby the adhesive force between the connection substrate and the filled resin lowers extremely.

(2) Since a thermal expansion coefficient of the resin is larger than that of the connection substrate, internal stress by which the resin intends to peel from the connection substrate (hereinafter, referred to as peeling force) is produced.

(3) By lowering of the adhesive force in (1) and generation of the peeling force in (2), the adhesive separation is produced between the connection substrate and the resin.

Further, in order to prevent the occurrence of the above adhesive separation, a measurement of changing the resin to resin having strong adhesive force is thought. However, even in case that the resin having the strong adhesive force is used, since the resin becomes thick, the peeling force which becomes large in proportion to the volume of the resin is not reduced. Therefore, due to the occurrence of the peeling force with the temperature rise, the adhesive separation arises between the connection substrate and the resin, so that there is fear that the permeation of the water into its separation part might cause the decrease of insulation resistance or the insulation breakdown.

Further, stagnation of the refrigerant is produced in the gap portion in the refrigerant passage formed between the connection substrate or the surroundings of the winding accommodating frame and the housing. In case that the pure water or the ultra pure water is used as the refrigerant, specific resistance of the refrigerant sharply reduces near its gap portions, and the insulation resistance lowers.

(4) When the water absorption of the filled resin proceeds, the water permeates also the joint part between the terminal of the terminal base and the lead part, so that there is fear that the insulation resistance might lower and the insulation breakdown might arise.

(5) In case that pin holes or scars exist on the coating of the lead wire, ground fault is produced by the contact between the lead wire and the housing, so that there is fear that the insulation breakdown might arise.

Further, in case that the plural lead wires exist, since they are arranged in the complicated form while being entwined with one another, the filled resin is not filled between the lead wires and an air bank is produced. When the filled resin absorbs the water, the water stays in the portion of the air bank, and there is fear that the insulation resistance might lower and the insulation breakdown might arise.

(6) In a supplying operation of the filled resin, first, a seal tape is attached to the housing so that the filled resin does not attach to the groove for the O-ring, and thereafter the filled resin is supplied up to a specified height level by eye measure. Further, in a hardening operation of the filled resin, the filled resin is hardened at a specified temperature in a long time. Namely, in manufacture of the canned linear motor armature, particularly, the workability of the filled resin is bad.

The invention has been made in order to solve the above problems, and it is an object of the invention to provide a canned linear motor armature and a canned linear motor in which insulation reliability of the canned linear motor armature of a water cooling type is improved, and assembly workability is good.

Means for Solving the Problems

In order to solve the above problems, the invention is constituted as follows.

According to a first aspect of the invention, there is provided a canned linear motor armature including:

an armature winding which is formed in the shape of a flat plate and includes coils;

a winding accommodating frame formed in the shape of a recess having an opened bottom portion for accommodating the armature winding;

a flat plate-shaped connection substrate which closes airtightly the opening portion of the winding accommodating frame and connects the armature winding;

a metallic housing, which is formed in the shape of a frame so as to surround the armature winding sealed by the winding accommodating frame and the connection substrate;

cans which close airtightly both opening portions of the housing;

refrigerant passages formed respectively between the can and the winding accommodating frame and between the can and the connection substrate; and a lead wire which connects the connection substrate, wherein coating with an adhesive resin is provided around a connection part between the connection substrate and the lead wire so as to include the connection part, and the surroundings of the adhesive resin are filled with a filled resin.

Further, according to a second aspect of the invention, there is provided the canned linear motor armature according to the first aspect, wherein a seal resin is provided in a gap formed between the connection substrate and the housing and in a gap formed between the winding accommodating frame and the housing in order to seal the gaps.

Further, according to a third aspect of the invention, there is provided the canned linear motor armature according to the first aspect, wherein the adhesive resin includes an epoxy resin and the filled resin includes a silicone resin.

Further, according to a fourth aspect of the invention, there is provided the canned linear motor armature according to the second aspect, wherein the seal resin includes a silicon resin.

Further, according to a fifth aspect of the invention, there is provided a canned linear motor armature including:

an armature winding which is formed in the shape of a flat plate and includes coils;

a winding accommodating frame formed in the shape of a recess having an opened bottom portion for accommodating the armature winding;

a flat plate-shaped connection substrate which closes airtightly the opening portion of the winding accommodating frame and connects the armature winding;

a metallic housing, which is provided so as to surround the winding accommodating frame in the shape of a frame;

cans which close airtightly both opening portions of the housing;

refrigerant passages formed respectively between the can and the winding accommodating frame and between the can and the connection substrate; and a lead wire which connects to the connection substrate, wherein a connection part between the connection substrate and the lead wire is arranged in the recess portion of the winding accommodating frame, and the inside of the recess portion is filled with molding resin.

Further, according to a sixth aspect of the invention, there is provided the canned linear motor armature according to the fifth aspect, wherein the lead wire is pulled out from the winding accommodating frame toward a joint surface between the winding accommodating frame and the housing, and a rubber seal member is provided on the joint surface so as to include the surroundings of the lead wire.

Further, according to a seventh aspect of the invention, there is provided the canned linear motor armature according to the fifth or sixth aspect, wherein a frame fixing bolt for fastening mechanically the housing and the winding accommodating frame is provided between the housing and the winding accommodating frame, and the joint surface is so constituted as to be inclined in relation to the frame fixing bolt fastening direction.

Further, according to an eighth aspect of the invention, there is provided the canned linear motor armature according to the fifth or sixth aspect, including:

a printed board in which the lead wire is constituted by copper foils.

Further, according to a ninth aspect of the invention, there is provided a canned linear motor including:

the canned linear motor armature according to any one of the first to eighth aspects; and a field magnet which is disposed so as to be opposed to the armature through a magnetic gap and which includes plural permanent magnets arranged adjacently so that polarities are alternately different, wherein with one of the armature and the field magnet as a stator and with the other as a movable element, the field magnet and the armature move relatively to each other.

EFFECTS OF THE INVENTION

According to the first aspect of the invention, since coating with the adhesive resin is provided so as to include the connection part between the connection substrate and the lead wire, adhesive force between the adhesive resin and the connection substrate in the rise time of temperature is heightened. Further, since the surroundings of the adhesive resin is filled with the filled resin, the adhesive resin does not come into direct contact with the water as the refrigerant, so that lowering of the adhesive force due to the water absorption is suppressed. Further, since the adhesive resin for coating is applied thin, the peeling force which is in proportion to the volume of the resin is reduced.

By heightening of the adhesive force in the rise time of temperature, suppression of lowering of the adhesive force caused by the water absorption, reduction of the peeling force as described above, it is possible to prevent the adhesive separation which has occurred in the related arts, so that the problems of lowering of the insulation resistance and the insulation breakdown which are caused by the water permeation can be resolved, and reliability of the insulation performance can be rapidly improved.

According to the second aspect of the invention, the gap in the refrigerant passage formed between the connection substrate or the surroundings of the winding accommodating frame and the housing is sealed with the seal resin. Therefore, stagnation of the refrigerant in the refrigerant passage can be reduced. Particularly, in case that the pure water or the ultra pure water is used as the refrigerant, reduction of the specific resistance of the pure water or the ultra pure water can be suppressed.

In result, the specific resistance of the refrigerant can be made constant for a long period in any portion inside the refrigerant passage, so that reliability of the insulation performance can be improved.

According to the third and fourth aspects of the invention, as the adhesive resin having the strong adhesive force even in the rise time of temperature, the epoxy resin is used, and as the filled resin and the seal resin which have elasticity after hardening, the silicone resin is used. Therefore, the adhesive resin can heighten the adhesive force for the connection substrate, and the filled resin and the seal resin can reduce the peeling force in relation to the peripheral members produced by the thermal expansion.

As a result, the adhesive separation between the members can be prevented, whereby the problems of lowering of the insulation resistance and the insulation breakdown caused by the water permeation in the resin separated portion can be resolved, and reliability of the insulation performance can be improved.

According to the fifth aspect of the invention, the connection part between the connection substrate and the lead wire is arranged in the recess portion of the winding accommodating frame, and the inside of the recess portion is filled with the molding resin. Therefore, the winding accommodating frame, the connection substrate, and the lead wire are integrated by the molding resin, so that the adhesive force between the members is heightened. Further, these components are the epoxy-based low-water absorption members, in which lowering of the adhesive force due to the water absorption is difficult to arise.

As described above, by heightening of the adhesive force, and suppression of lowering of the adhesive force caused by the water absorption, it is possible to prevent the adhesive separation which has occurred in the related arts, so that the problems of lowering of the insulation resistance and the insulation breakdown which are caused by the water permeation can be resolved, and reliability of the insulation performance can be rapidly improved.

According to the sixth aspect of the invention, the lead wire is pulled out from the winding accommodating frame toward the joint surface between the winding accommodating frame and the housing, and the rubber seal material is provided on the joint surface so as to include the surroundings of the lead wire. Therefore, it is possible to prevent the water permeation from the joint surface into the winding accommodating frame inside and to the terminal base.

Therefore, the problems of lowering of the insulation resistance and the insulation breakdown can be resolved more, and reliability of the insulation performance can be rapidly improved. Further, since the filling operation is eliminated, and the rubber seal member by which the operation can be performed easily and in a short time is alternatively provided, assembly workability can be also improved.

According to the seventh aspect of the invention, the frame fixing bolt for fastening mechanically the housing and the winding accommodating frame is provided, and the joint surface is so constituted as to be inclined in relation to the frame fixing bolt fastening direction. Therefore, compared with the constitution in the sixth aspect, adhesiveness of the joint surface can be remained by easy assembly, and sealing performance of the rubber seal member can be secured. Resultantly, the reliability of the insulation performance and the assembly workability can be improved similarly to those in the sixth aspect.

According to the eighth aspect of the invention, since the lead wire is constituted by the printed board in which the copper foils are formed, the contact between the printed board and the housing can be prevented, widening of insulation space can improve the reliability of the insulation performance. Further, even in case that the plural lead wires exit, the air bank among the lead wires which has been heretofore produced is not produced.

Therefore, even under the structure in which the rubber seal member is not provided unlike the case in the sixth aspect, the problems of lowering of the insulation resistance and the insulation breakdown caused by the water permeation into the air bank can be resolved, and reliability of the insulation performance can be improved.

According to the ninth aspect of the invention, the field magnet having the permanent magnets is disposed so as to be opposed to the armature, wherein one of the armature and the field magnet is constituted as the stator and the other is constituted as the movable element. Therefore, the canned linear motor having the advantages in the first to eighth aspects can be provided.

DESCRIPTION OF REFERENCE NUMERALS AND SIGNS

Figure 1:
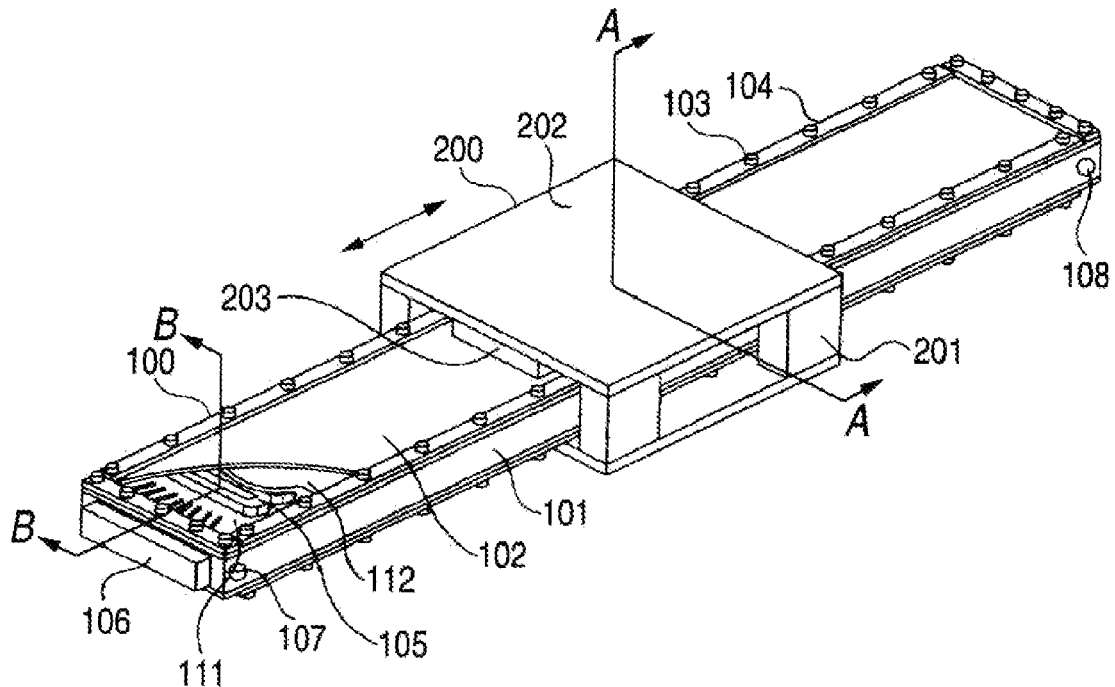
FIG. 1 is an entire perspective view of a general canned linear motor including a movable element in which an armature which is common in a first embodiment of the invention and in a related art is covered with a can.

100 Stator
101 Housing
102 Can
103 Can fixing bolt
104 Pressing plate
105 Armature winding
106 Terminal base
107 Refrigerant supply port
108 Refrigerant discharge port
109 O-ring
110 Refrigerant passage
111 Connection substrate
112, 140, 140*a*, 140*b*, 140*c* Winding accommodating frame
113 Molding resin
120, 120*a* Lead wire
121 Land
122 Lead wire cover
130 Resin
131 Adhesive resin
132 Filled resin
133 Seal resin
141 Frame fixing bolt
142 Lead part O-ring
143 O-ring bolt
144 O-ring press member
145 Printed board
200 Movable element

201 Field yoke support member
202 Filed yoke
203 Permanent magnet

BEST MODE FOR CARRYING OUT THE INVENTION

Embodiments of the invention will be described below in detail with reference to drawings.

Embodiment 1

Figure 2:
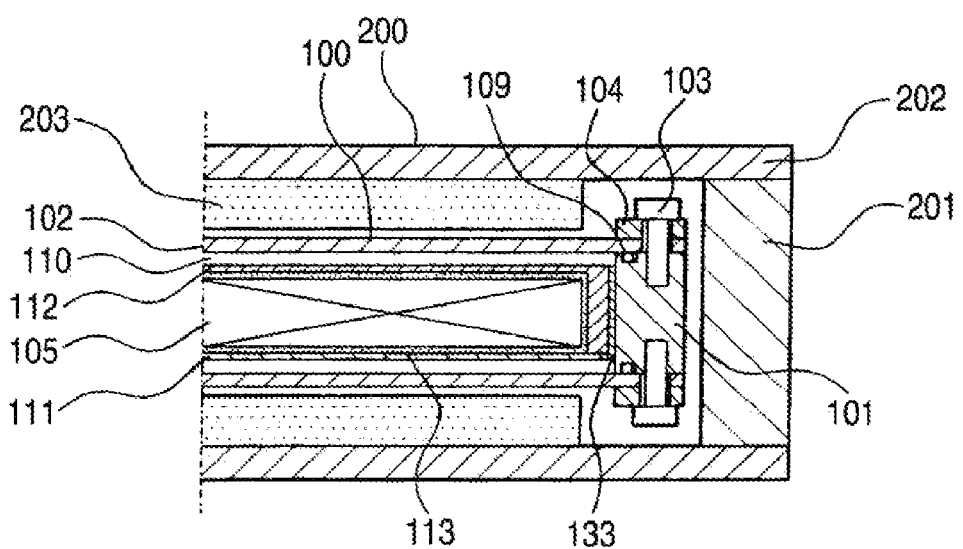
FIG. 2 shows a canned linear motor in the first embodiment of the invention, which corresponds to a front sectional view taken along the inside of a line A-A in FIG. 1.
Figure 3:
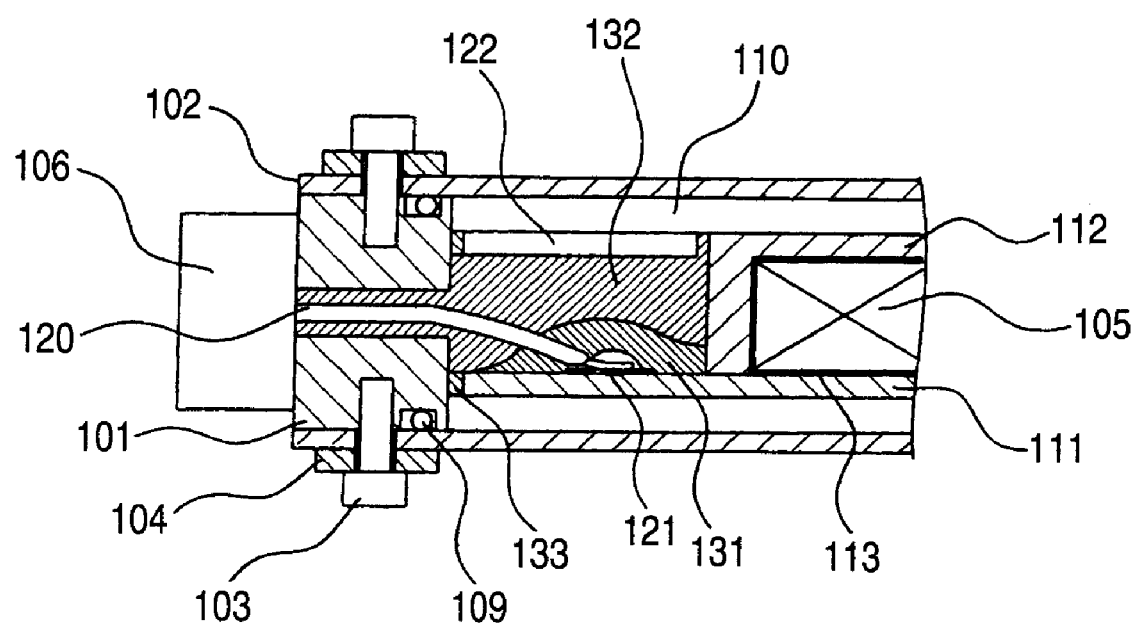
FIG. 3 shows the canned linear motor in the first embodiment of the invention, which corresponds to a side sectional view taken along the inside of a line B-B in FIG. 1.

FIG. 2 shows a canned linear motor in a first embodiment of the invention, which corresponds to a front sectional view taken along the inside of a line A-A in FIG. 1. FIG. 3 shows the canned linear motor in the embodiment of the invention, which corresponds to a side sectional view taken along the inside of a line B-B in FIG. 1. The same components in the invention as those in the related art are denoted by the same reference numerals, an explanation of them are omitted, and only different points will be described. Further, the description of the entire constitution of a general canned linear motor having a movable element in which an armature is covered with a can is omitted, because the common parts in the related art and the invention have been described before in FIG. 1.

In FIGS. 2 and 3, a reference numeral 131 is an adhesive resin, 132 is a filled resin, and 133 is a seal resin.

The first embodiment is different from the related art in the following points.

Namely, in FIG. 2, in a gap formed between a connection substrate 111 and a housing 101 and in a gap formed between a winding accommodating frame 112 and the housing 101, there is provided a seal resin 133 for sealing the gaps. As the seal resin 133, a silicone resin having medium viscosity is used, which has characteristics that it has elasticity after hardening so as to enable absorption of thermal expansion of the peripheral members, and that it is easy to be applied on the sealing part without flowing down in the hardening time.

Further, in FIG. 3, the surroundings of a land 121 provided at a terminus of a copper pattern (not shown) constituting a connection part for connecting an armature winding and a lead wire on the connection substrate 111 are coated with the adhesive resin 131 so that the connection part is included, and the surroundings of the adhesive resin 131 are filled with the filled resin 132. As the adhesive resin 131, an epoxy resin is used, which is extremely high in adhesive force to the connection substrate 111. As the filled resin 132, a silicone resin having low viscosity is used, which has characteristics that it has elasticity also after hardening so as to enable absorption of thermal expansion of the adhesive resin 131, the housing 101 around the adhesive resin 131, and the winding housing frame 112, that an air bank is difficult to be produced in the filled resin 132 in the hardening time, and that it has excellent flowability and defoaming property.

Next, the operation will be described with reference to FIGS. 1 to 3.

When electric power is supplied from the outside to a terminal base 106 of a linear motor stator 100, and the electric current flows to an armature winding 105, the armature winding generates heat due to copper losses. Simultaneously with this operation, a refrigerant is supplied to a refrigerant supply port 107 provided for the housing 101 of the stator 100, flows in refrigerant passages 110 of constant air gaps formed between a can 102 and the connection substrate 111 and between the can 102 and the winding accommodating frame 112, and thereafter is discharged toward a refrigerant discharge port 108. The refrigerant circulates in the refrigerant passages 110, thereby to cool the armature winding 105 which generates the heat due the copper losses. At this time, by adoption of the filled resin 132 and the adhesive resin 131 covering the surroundings of the connection part for connecting the armature winding 105 and the lead wire 120 on the connection substrate 111, the refrigerant is prevented from permeating directly into the adhesive resin 131, so that there is no problem of decrease in insulation resistance or insulation breakdown. Further, by adoption of the seal resin 133 which seals the gap in the refrigerant passage 110 formed between the connection substrate 111 or the surroundings of the winding accommodating frame 112 and the housing 101, the stagnation of the refrigerant in the refrigerant passage 110 is eliminated, and the refrigerant circulates in the refrigerant passage 110 smoothly, so that the rise of temperature on the surface of the can is decreased, and cooling capability is improved.

Accordingly, in the first embodiment of the invention, since coating with the adhesive resin is provided so as to include the connection part between the connection substrate and the lead wire, the thermal expansion of the connection part can be made small by the adhesive resin, so that it is possible to reduce tensile strength produced by difference in thermal expansion between the resin and the connection substrate, and it is possible to prevent adhesive separation.

Further, since the canned linear motor is so constituted that the surroundings of the adhesive resin are filled with the filled resin, it is possible to prevent the adhesive resin, by the filled resin, from coming into direct contact with water that is the refrigerant, to reduce water absorption of the filled resin, and also to eliminate lowering of the adhesive force caused by the water absorption.

Therefore, problems of lowering of insulation resistance and insulation breakdown due to water permeation into the adhesive separation part can be resolved, and reliability of insulation can be improved.

Further, since the seal resin seals the gaps in the refrigerant passages formed between the connection substrate and the housing and between the surroundings of the winding accommodating frame and the housing, the stagnation of the refrigerant in the refrigerant passage can be reduced. Particularly, in case that pure water or ultra pure water is used as the refrigerant, reduction of the specific resistance of the pure water or the ultra pure water can be suppressed. In result, even in case of the circular type cooling device, the specific resistance of the refrigerant itself can be made constant for a long period, so that reliability of the insulation performance can be improved.

Furthermore, since the epoxy resin is used as the adhesive resin, and the silicone resin having elasticity after hardening is used as the filled resin and the seal resin, the adhesive resin can heighten the adhesive force between the members, and the thermal expansion of the peripheral members can be absorbed.

Therefore, it is possible to prevent the adhesive separation between the members due to the thermal expansion, the problems of lowering of insulation resistance and insulation breakdown due to the water permeation into the adhesive separation part can be resolved, and reliability of insulation can be improved.

Furthermore, an armature is disposed so as to be opposed to a field magnet having a permanent magnet, in which either one of the armature and the field magnet is constituted as a stator and the other is constituted as a movable element. Therefore, the canned linear motor having the above advantages can be provided.

Embodiment 2

Next, a second embodiment of the invention will be described.

Figure 4:
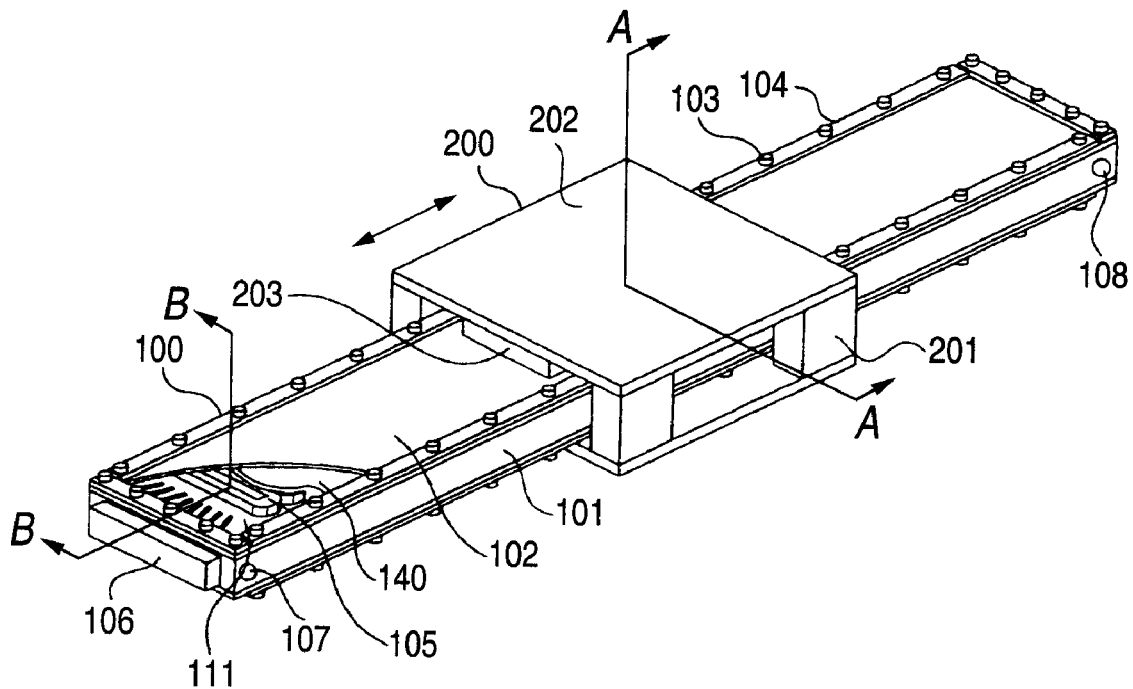
FIG. 4 (*a-b*) shows a canned linear motor in a second embodiment of the invention, in which (a) corresponds to an entire perspective view of the canned linear motor, and (b) corresponds to a front sectional view (½ model) taken along the inside of a line A-A in (a).
Figure 4:
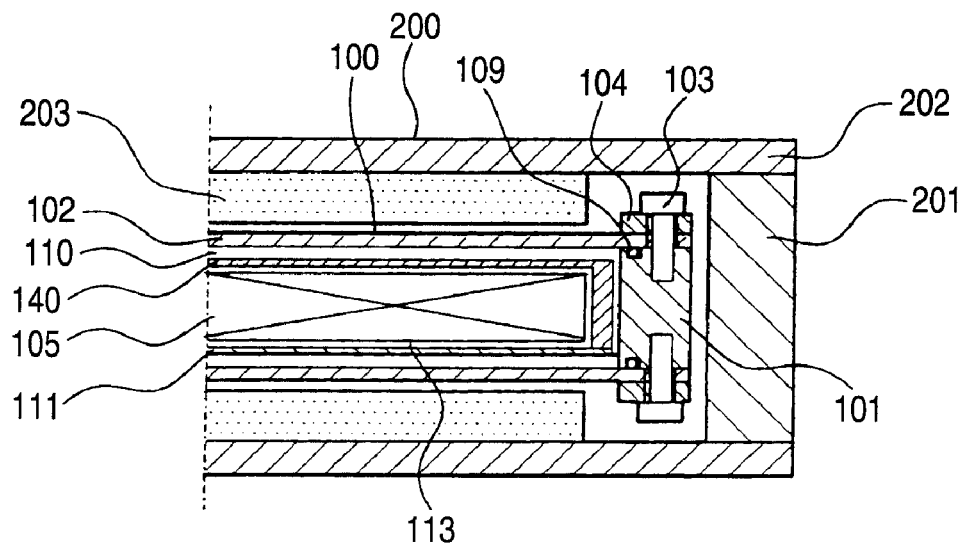
Figure 5:
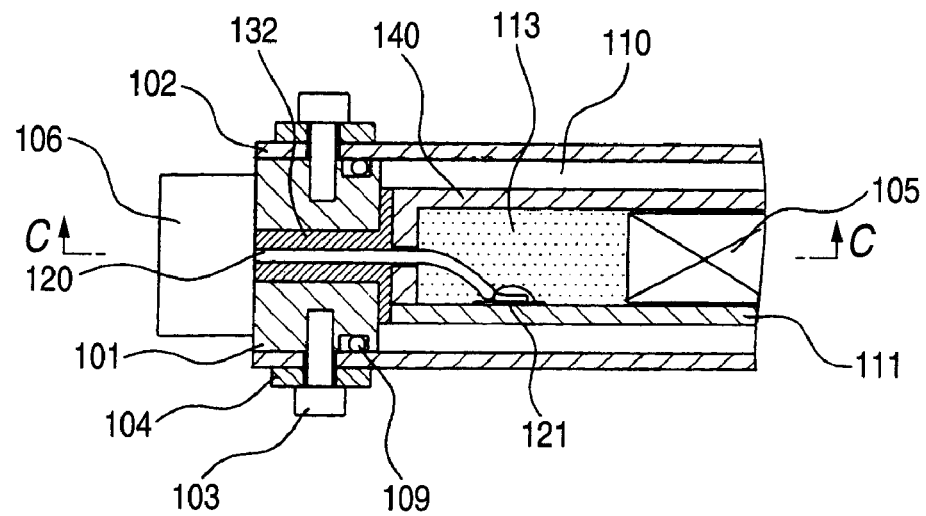
FIG. 5 shows the canned linear motor in the second embodiment of the invention, which corresponds to a side sectional view taken along the inside of a line B-B in FIG. 4 (*a*).
Figure 6:
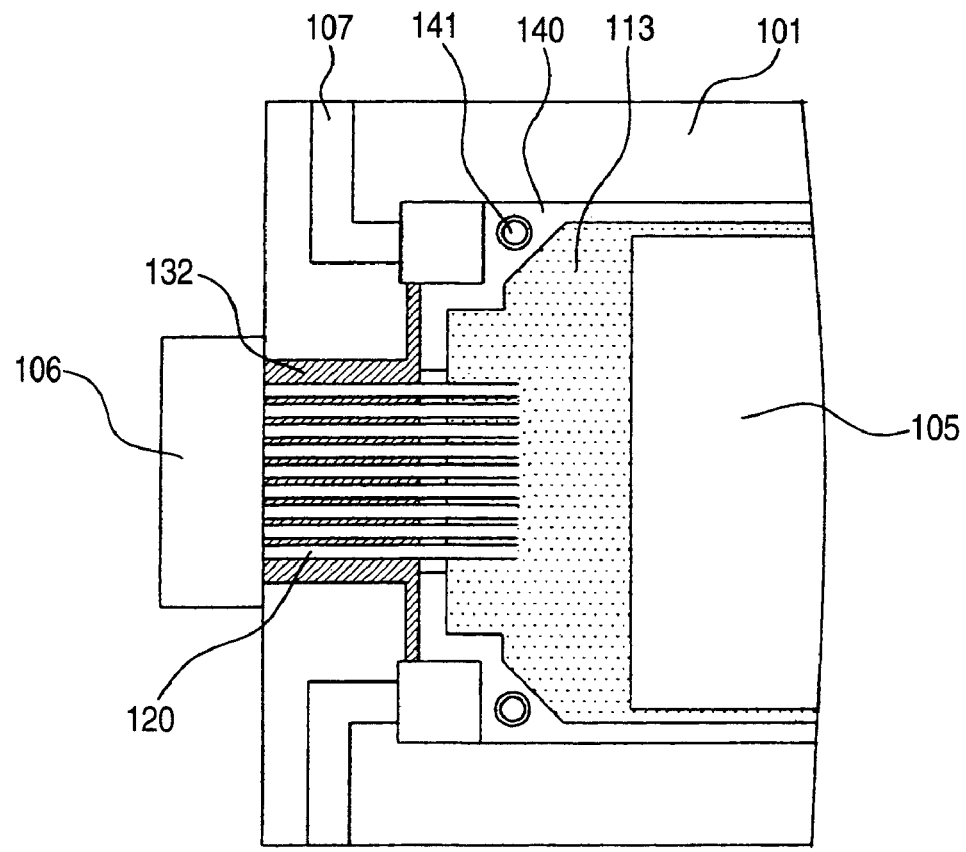
FIG. 6 is a plan sectional view taken along the inside of a line C-C in FIG. 5 in the second embodiment.

FIG. 4 (*a-b*) shows a canned linear motor in a second embodiment of the invention, in which (a) corresponds to an entire perspective view of the canned linear motor, and (b) corresponds to a front sectional view (½ model) taken along the inside of a line A-A in (a), FIG. 5 shows the canned linear motor in the second embodiment of the invention, which corresponds to a side sectional view taken along the inside of a line B-B in FIG. 4 (*a*), and FIG. 6 is a plan sectional view taken along the inside of a line C-C in FIG. 5 in the second embodiment. Here, the entire perspective view of FIG. 4(*a*) is common in third to fifth embodiments described later.

The same components in the second embodiment as those in the related art and the first embodiment are denoted by the same reference numerals, an explanation of them are omitted, and only different points will be described.

In FIG. 5, a reference numeral 140 is a winding accommodating frame.

The second embodiment of the invention is different from the related art in structure of a stator 100, and its structure will be described below.

Namely, the stator 100 includes, as shown in FIG. 4 (*a-b*), a metallic housing 101 formed in the shape of a character and having a hollow inner part, a plate-shaped can 102 having the outer shape of the housing 101 in order to close airtightly the hollow part of the housing 101, a can fixing bolt 103 for fixing the can 102 to the housing 101, a pressing plate 104 which has a through-hole for the can fixing bolt 103 and presses the can 102 by an equal load, an armature winding 105 arranged in the hollow part of the housing 101, a connection substrate 111, a winding accommodating frame 140 formed in the shape of a recess having an opened bottom portion, and an O-ring 109 formed to be slightly larger than the hollow part of the housing 101.

The external shape of the connection substrate 111 and the external shape of the winding accommodating frame 112 are formed respectively to be slightly smaller than the hollow part of the housing 101. The connection substrate 111 is formed of a thin plate, and the winding accommodating frame 140 is formed of a thick plate and has a recess part formed by cutting the frame in the thickness direction in such a way that the cut portion is slightly larger than the outer shape of the armature winding 105. The armature winding 105 is accommodated in the recess part of the winding accommodating frame 140 and covered up tightly with the connection substrate 111, and the inside of the covered portion is molded by a molding resin 113. Further, the armature winding 105 is electrically connected to the connection substrate 111.

The thus constructed armature winding 105 is fixed to the housing 101 through the connection substrate 111 or the winding accommodating frame 140 by the frame fixing bolt 141 that is a mechanically fastening means. On the edges of the front and back parts of the housing 101, circulating grooves are provided, and the O-rings 109 are arranged in the grooves. Then, the cans 102 are arranged on the front and back parts of the housing 101. The pressing plate 104 is laid on the can 102 along the edge of the housing 101 and fastened by the can fixing bolt 103, whereby the can 102 is fixed to the housing 101.

At this time, a constant gap is formed between the can 102 and the connection substrate 111 and between the can 102 and the winding accommodating frame 140, and this gap becomes a refrigerant passage 110. The refrigerant is supplied from a refrigerant supply port 107 provided in the housing 101 and discharged from a refrigerant discharge port 108. During that time, the refrigerant flows in the refrigerant passage 110 to cool the armature winding 105 that generates heat due to copper losses. Further, as the refrigerant, there is used water (including pure water and ultra pure water) which is large in thermal conductivity and specific heat, and extremely high in heat recovery.

On the other hand, a copper foil pattern (not shown) for connecting the armature winding 105 and a lead wire 120 is provided for the connection substrate 111, and a land 121 is provided at a terminus of the copper foil pattern. One end of the lead wire 120 is connected to the land 121 by solder. The land 121 portion is accommodated in the recess part of the winding accommodating frame 140, and the lead wire 120 is pulled out toward the joint surface between the winding accommodating frame 140 and the housing 101. The inside of the recess part of the winding accommodating frame 140 is filled with the molding resin, so that the lead wire 120, the coil 105, and the connection substrate 111 are secured integrally in the winding accommodating frame 140 by the molding resin. The lead wire 120 pulled out from the joint surface is connected to a terminal base 106. A part between the lead wire 120 and the housing 101 is filled with a filled resin 132. As the filled resin 132, a silicone resin is used which has such good flowability that the filled resin can be filled after the lead wire 120 has been disposed in the housing 101 and such rich elasticity that the filled resin can absorb thermal expansion of the housing.

Accordingly, in the second embodiment of the invention, since the winding accommodating frame, the connection substrate, and the lead wire are integrally molded by the molding resin, the adhesive force between the respective members is heightened. Further, since these component members are epoxy-based low-water absorption members, even in case that the rise of the temperature of them is produced, decrease of the adhesive force due to the water absorption is not easy to arise. Therefore, the adhesive force is remarkably heightened, whereby it is possible to prevent the adhesive separation which has occurred in the related arts, the problems of lowering of the insulation resistance and the insulation breakdown caused by the water permeation can be resolved, and reliability of the insulation performance can be rapidly improved.

Embodiment 3

Next, a third embodiment of the invention will be described.

Figure 7:
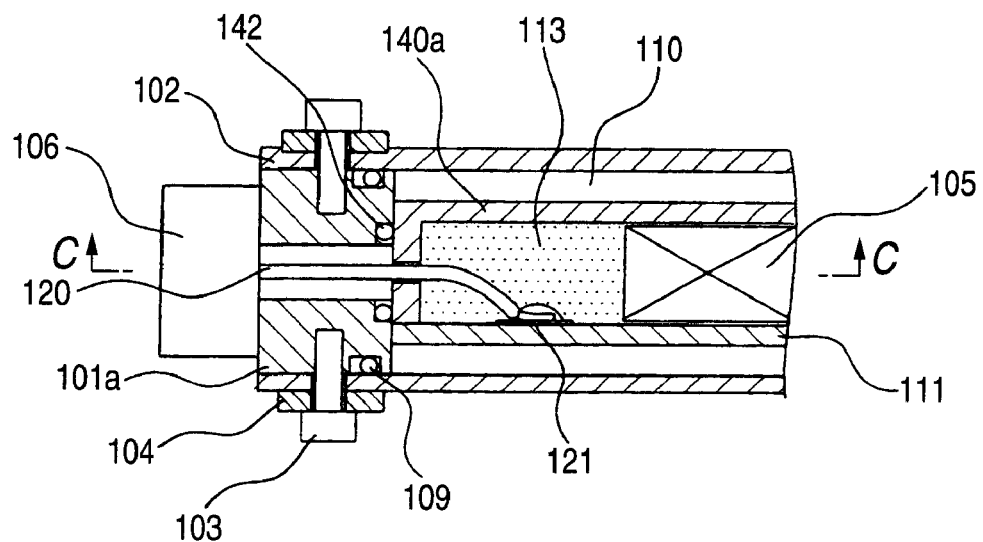
FIG. 7 shows a canned linear motor in a third embodiment of the invention, which corresponds to a side sectional view taken along the inside of a line B-B in FIG. 4 (*a*).
Figure 8:
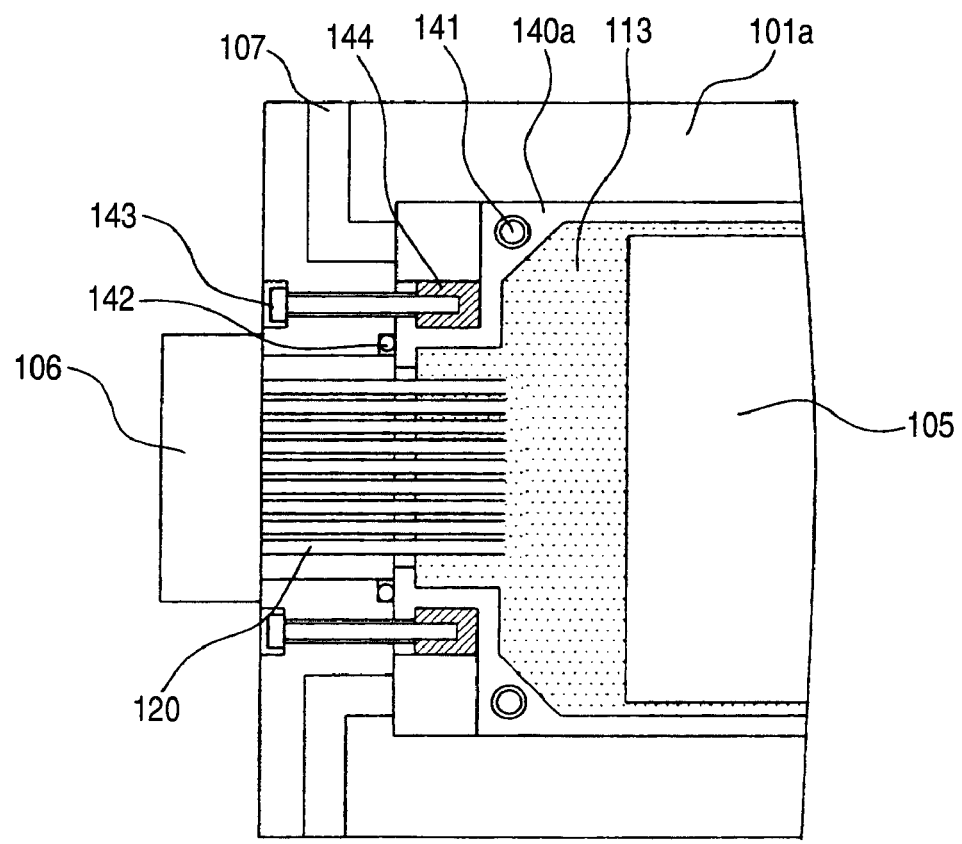
FIG. 8 is a plan sectional view taken along the inside of a line C-C in FIG. 7 in the third embodiment.

FIG. 7 shows a canned linear motor in a third embodiment of the invention, which corresponds to a side sectional view taken along the inside of a line B-B' in FIG. 4 (*a*), and FIG. 8 is a plan sectional view taken along the inside of a line C-C' in FIG. 7 in the third embodiment.

In FIGS. 7 and 8, a reference numeral 101*a* is a housing, 140*a* is winding accommodating frame, 142 is a lead part O-ring, 143 is an O-ring bolt, and 144 is an O-ring pressing member.

The third embodiment of the invention is different from the second embodiment in that the lead part O-ring 142 that is a rubber seal member is provided on a joint surface between the housing 101*a* and the winding accommodating frame 140*a* so as to include a lead wire 120. Therefore, a groove for the lead part O-ring 142 and a through hole for the O-ring bolt 143 are newly provided in the housing 101*a*. In the winding accommodating frame 140*a*, a groove in which the O-ring pressing member 144 is embedded is provided. When the O-ring bolt 143 is turned, the O-ring pressing member 144 is tightened up, and the winding accommodating frame 140a and the housing 101a come into close contact with each other. In this time, the lead part O-ring 142 is pressed by a predetermined amount, and the winding accommodating frame 140a and the housing 101a are sealed. Further, since the inside of the winding accommodating frame 140a is sealed by the lead part O-ring 142, the filled resin which has been provided in the related art is not provided.

Therefore, according to the third embodiment of the invention having the above constitution, water permeation from the joint surface into the winding accommodating frame and onto a terminal base can be prevented, so that the problems of lowering of the insulation resistance and the insulation breakdown can be resolved more, and reliability of the insulation performance can be improved. Further, since the filling operation is eliminated, and the O-ring of the rubber seal member by which the operation can be performed easily and in a short time is used in place of the filled resin, assembly workability can be also improved.

Embodiment 4

Next, a fourth embodiment of the invention will be described.

Figure 9:
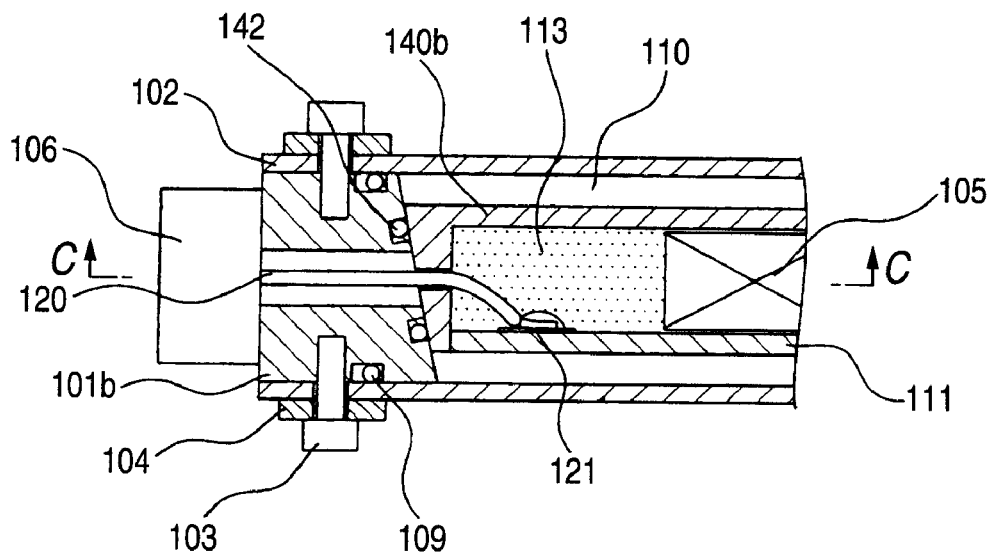
FIG. 9 shows a canned linear motor in a fourth embodiment of the invention, which corresponds to a side sectional view taken along the inside of a line B-B in FIG. 4 (*a*).
Figure 10:
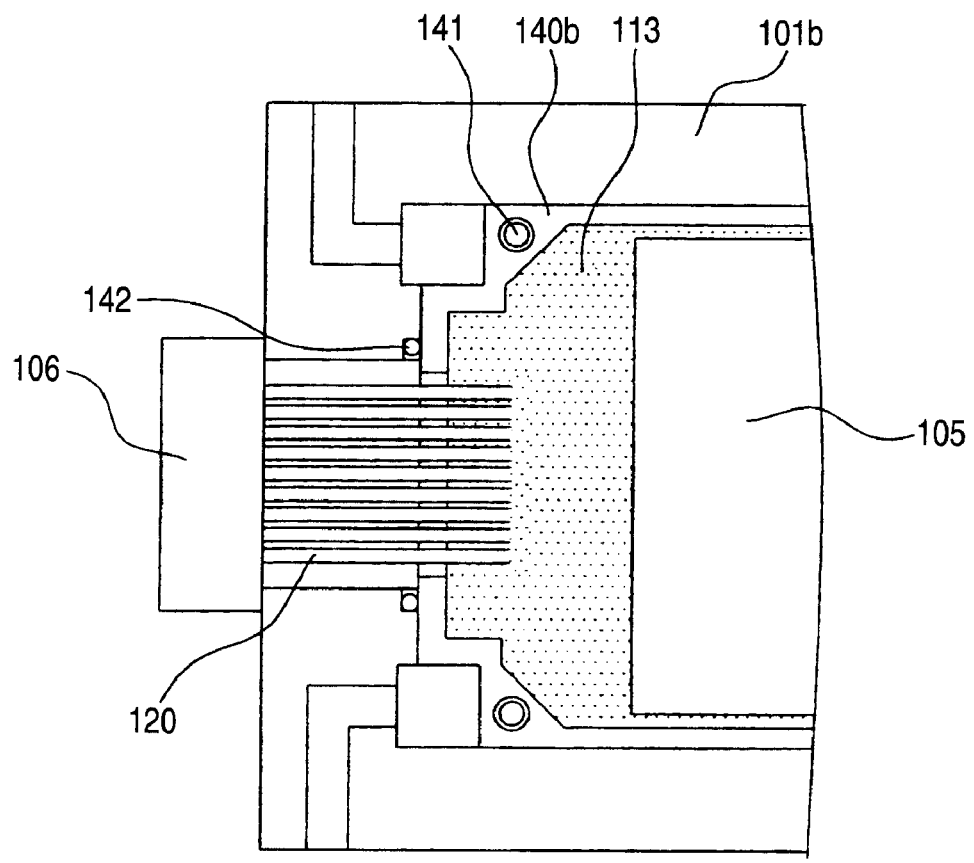
FIG. 10 is a plan sectional view taken along the inside of a line C-C in FIG. 9 in the fourth embodiment.

FIG. 9 shows a canned linear motor in a fourth embodiment of the invention, which corresponds to a side sectional view taken along the inside of a line B-B in FIG. 4 (*a*), and FIG. 10 is a plan sectional view taken along the inside of a line C-C in FIG. 9 in the fourth embodiment.

In FIGS. 9 and 10, a reference numeral 101b is a housing, and 140b is a winding accommodating frame.

The fourth embodiment is different from the first to third embodiments in that a joint surface between the housing 101b and the winding accommodating frame 140b is constituted slantingly.

Here, a frame fixing bolt 141 that is a tightening means for the housing 101b and the winding accommodating frame 140b is tightened in a vertical direction. Further, the O-ring bolt and the O-ring pressing member which are provided in the second aspect are excluded. When the winding accommodating frame 140b and the housing 101b are fixed by tightening the frame fixing bolt 141, they are brought into close contact with each other at their joint surface, and a lead part O-ring 142 is pressed by a predetermined amount to secure sealing performance of the joint surface.

Therefore, according to the fourth embodiment of the invention having such the constitution, compared with the case in the third embodiment, close contact performance of the joint surface is held by easy assembly, and sealing performance of the lead part O-ring that is a rubber seal member can be secured. Resultantly, while reliability of insulation is improving, assembly workability can be improved more than that in the third embodiment.

Embodiment 5

Next, a fifth embodiment of the invention will be described.

Figure 11:
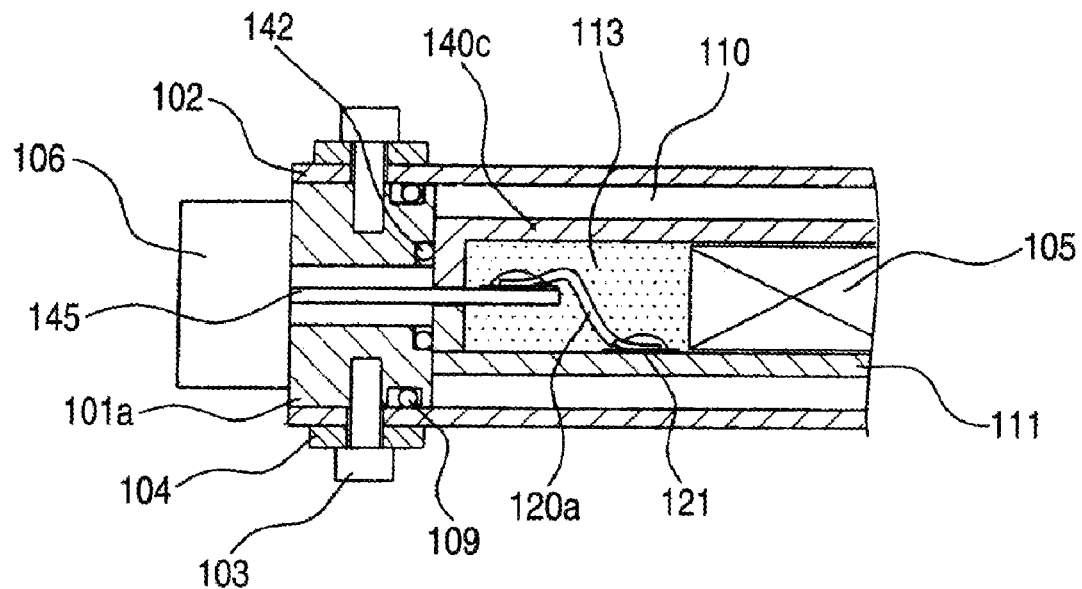
FIG. 11 shows a canned linear motor in a fifth embodiment of the invention, which corresponds to a side sectional view taken along the inside of a line B-B in FIG. 4 (*a*).
Figure 12:
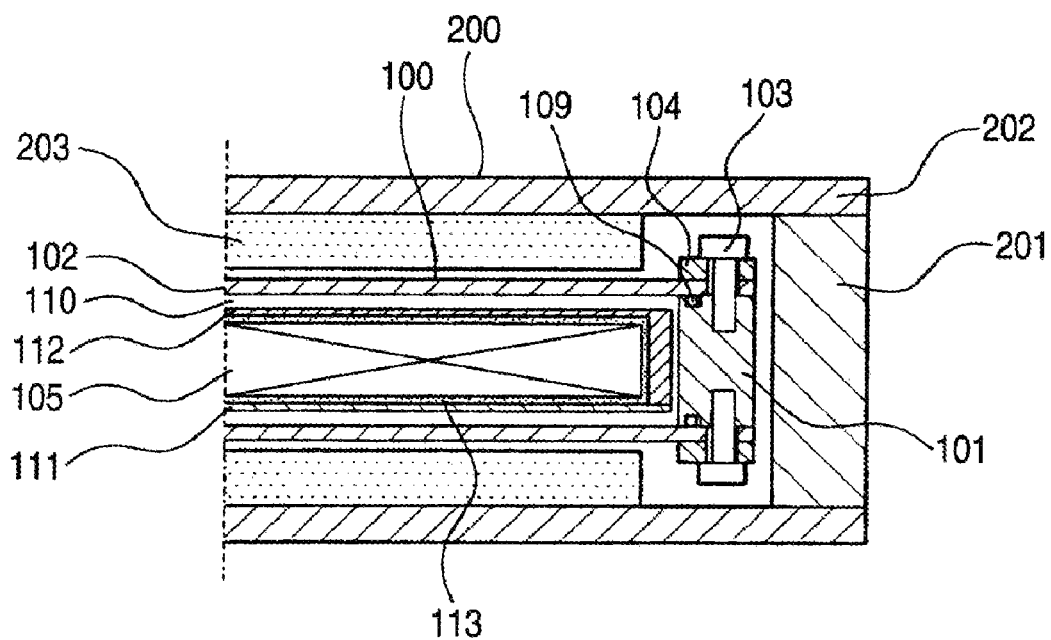
FIG. 12 shows a canned linear motor in a related art, which corresponds to a front sectional view taken along the inside of a line A-A in FIG. 1.
Figure 13:
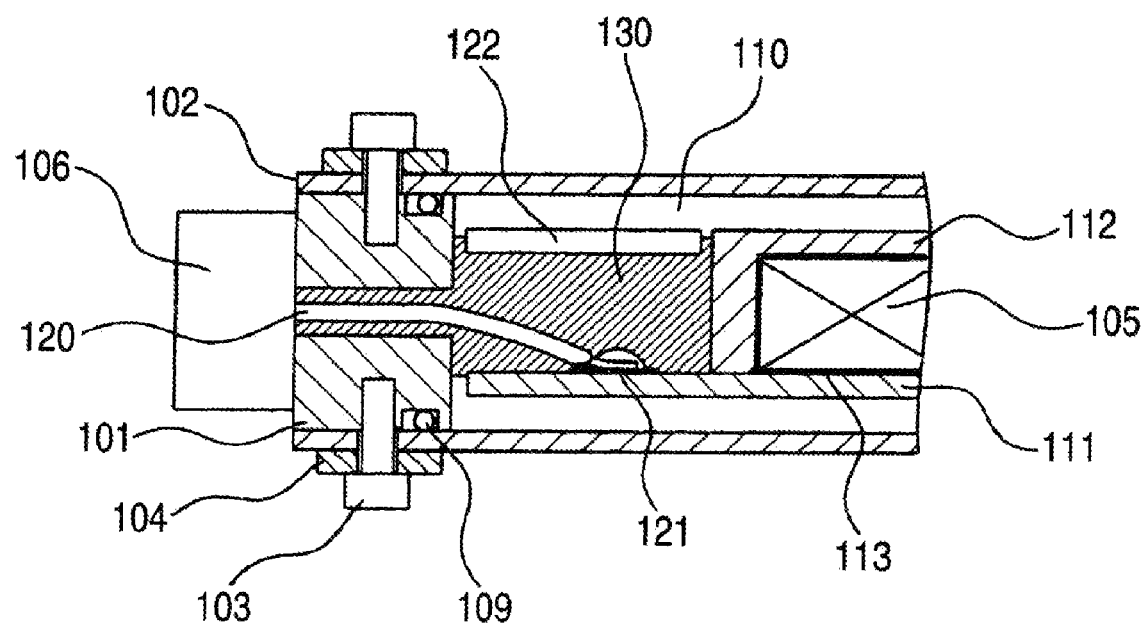
FIG. 13 shows a canned linear motor in the related art, which corresponds to a side sectional view taken along the inside of a line B-B in FIG. 1.

FIG. 11 shows a canned linear motor in a fifth embodiment of the invention, which corresponds to a side sectional view taken along the inside of a line B-B in FIG. 4 (*a*).

In FIG. 11, a reference numeral 120a is a lead wire, 140c is a winding accommodating frame, and 145 is a printed board.

The fifth embodiment is different from the third embodiment in that the lead wire pulled out from the winding accommodating frame 140c is changed to the printed board 145. In a recess part of the winding accommodating frame 140c, a short lead wire 120a is joined to a land 121 by solder, and the other end of the lead wire is joined to the printed board 145 by solder. The printed board 145 uses a flat plate-shaped glass epoxy resin as a base material, and has a copper foil pattern on its surface or therein. One end of the printed board 145 pulled out from the winding accommodating frame 140c is electrically connected to a terminal base 106.

Therefore, according to the fifth embodiment having such the constitution, the contact between the printed board and a housing can be prevented, and widening of insulation space can improve reliability of insulation. Further, even in case that a large number of lead wires exist, the air bank which has been heretofore produced between the lead wires is not produced. Therefore, even under the structure having no lead part O-ring like the case in the second embodiment, the problems of lowering of the insulation resistance and the insulation breakdown which are caused by the water permeation into the air bank can be resolved, and reliability of the insulation performance can be improved.

Although the structure in which the stator has the armature winding and the movable element has the field permanent magnet has been described in the first to fifth embodiments, the structure in which the stator has the field permanent magnet and the movable element has the armature winding may be adopted.

Further, although the movable element is formed in the shape of in the first to fifth embodiments, it is apparent that the movable element may be formed in the shape of a recess or the movable element may have a structure in which the permanent magnets are merely arranged in one side.

Further, although the armature winding has been explained above as three-phase AC linear motor composed of a plurality of concentrated winding coils, it may be a voice coil motor (VCM) in which one concentrated winding coil is provided, or may be a VCM in which a plurality of concentrated winding coils are provided for one armature and which can drive a plurality of movable elements.

Further, although the rubber seal member has been explained as the O-ring in the third to fifth embodiments, it may be a flat plate-shaped packing.

Further, although the printed board has been explained as the flat plate-shaped glass epoxy resin in the fifth embodiment, it may be a flexible printed board which can be curved.

Further, although the connection substrate of the coil and the printed board have been separately explained, a constitution in which these parts are formed integrally may be adopted.

INDUSTRIAL APPLICABILITY

According to the invention, the constitution in which coating with the adhesive resin is performed so as to include the connection part between the connection substrate of the linear motor armature and the lead wire, or the constitution in which the winding accommodating frame, the connection substrate, and the lead wire are molded integrally by the molding resin is adopted. Therefore, the adhesive separation can be prevented, the problems of lowering of the insulation resistance and the insulation breakdown which are caused by the water permeation can be resolved, and reliability of the insulation performance can be rapidly improved. Accordingly, the invention can be applied to a semiconductor exposing device and an inspection device which require reduction of temperature rise of the linear motor body and improvement of reliability of insulation.

The invention claimed is:

1. A canned linear motor armature comprising:
an armature winding which is formed in the shape of a flat plate and includes coils;
a winding accommodating frame formed in the shape of a recess having an opened bottom portion for accommodating the armature winding;
a flat plate-shaped connection substrate which closes airtightly the opened bottom portion of the winding accommodating frame and connects the armature winding;
a metallic housing, which is formed in the shape of a frame so as to surround the armature winding sealed by the winding accommodating frame and the connection substrate;
cans which close airtightly both opening portions of the housing;
refrigerant passages formed respectively between the can and the winding accommodating frame and between the can and the connection substrate; and
a lead wire which connects the connection substrate, wherein
coating with an adhesive resin is provided around a connection part between the connection substrate and the lead wire so as to include the connection part, and
the surroundings of the adhesive resin are filled with a filled resin.

2. The canned linear motor armature according to claim 1, wherein
a seal resin is provided in a gap formed between the connection substrate and the housing and in a gap formed between the winding accommodating frame and the housing in order to seal the gaps.

3. The canned linear motor armature according to claim 1, wherein
the adhesive resin includes an epoxy resin and the filled resin includes a silicone resin.

4. The canned linear motor armature according to claim 2, wherein
the seal resin includes a silicon resin.

5. A canned linear motor armature comprising:
an armature winding which is formed in the shape of a flat plate and includes coils;
a winding accommodating frame formed in the shape of a recess having an opened bottom portion for accommodating the armature winding;
a flat plate-shaped connection substrate which closes airtightly the opened bottom portion of the winding accommodating frame and connects the armature winding;
a metallic housing, which is provided so as to surround the winding accommodating frame in the shape of a frame;
cans which close airtightly both opening portions of the housing;
refrigerant passages formed respectively between the can and the winding accommodating frame and between the can and the connection substrate; and
a lead wire which connects the connection substrate, wherein
a connection part between the connection substrate and the lead wire is arranged in the recess portion of the winding accommodating frame, and
the inside of the recess portion is filled with a molding resin.

6. The canned linear motor armature according to claim 5, wherein
the lead wire is pulled out from the winding accommodating frame toward a joint surface between the winding accommodating frame and the housing, and
a rubber seal member is provided on the joint surface so as to include the surroundings of the lead wire.

7. The canned linear motor armature according to claim 5 wherein
a frame fixing bolt for fastening mechanically the housing and the winding accommodating frame is provided between the housing and the winding accommodating frame, and
the joint surface is so constituted as to be inclined in relation to the frame fixing bolt fastening direction.

8. The canned linear motor armature according to claim 5 comprising:
a printed board in which the lead wire is constituted by copper foils.

9. A canned linear motor comprising:
the canned linear motor armature according to claim 1; and
a field magnet which is disposed so as to be opposed to the armature winding through a magnetic gap and which includes plural permanent magnets arranged adjacently so that polarities are alternately different, wherein
with one of the armature winding and the field magnet as a stator and with the other as a movable element, the field magnet and the armature winding move relatively to each other.

10. A canned linear motor comprising:
the canned linear motor armature according to claim 5; and
a field magnet which is disposed so as to be opposed to the armature winding through a magnetic gap and which includes plural permanent magnets arranged winding adjacently so that polarities are alternately different, wherein
with one of the armature winding and the field magnet as a stator and with the other as a movable element, the field magnet and the armature move relatively to each other.

* * * * *